Figures 1, 2:
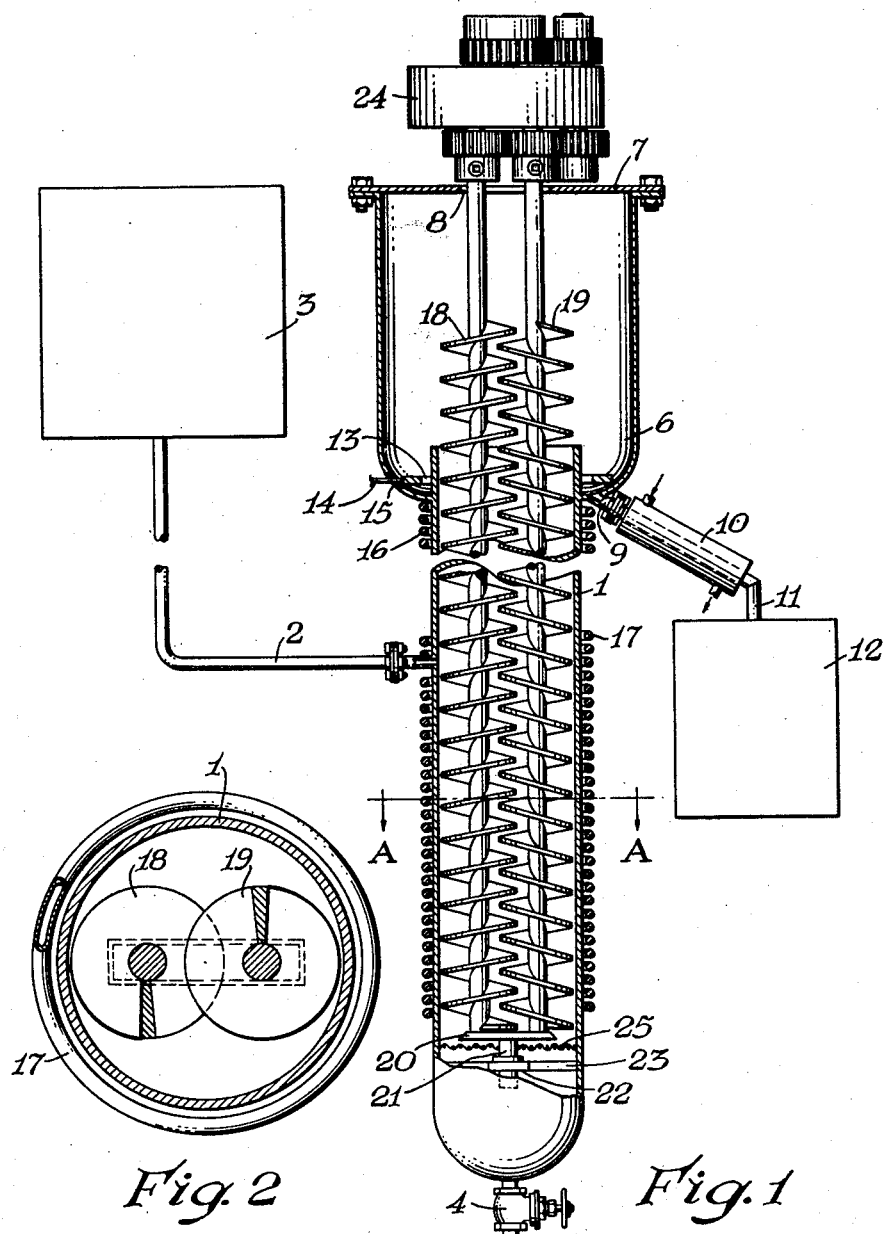

Nov. 17, 1953     L. K. FREVEL ET AL     2,659,761
FRACTIONAL CRYSTALLIZATION METHOD

Filed Aug. 23, 1948     2 Sheets—Sheet 1

INVENTORS.
Ludo K. Frevel
Leonard J. Kressley
BY
Griswold & Burdick
ATTORNEYS

Nov. 17, 1953   L. K. FREVEL ET AL   2,659,761
FRACTIONAL CRYSTALLIZATION METHOD
Filed Aug. 23, 1948   2 Sheets-Sheet 2

INVENTORS.
Ludo K. Frevel
Leonard J. Kressley
BY
Griswold & Burdick
ATTORNEYS

Patented Nov. 17, 1953

2,659,761

UNITED STATES PATENT OFFICE 2,659,761

FRACTIONAL CRYSTALLIZATION METHOD

Ludo K. Frevel, Midland, and Leonard J. Kressley, Saginaw, Mich., assignors to The Dow Chemical Company, Midland, Mich., a corporation of Delaware Application August 23, 1948, Serial No. 45,664

11 Claims. (Cl. 260—652)

This invention concerns a method and apparatus for carrying out fractional crystallization operations effectively and in a simple manner.

Of the several usual ways, e. g. distillation, extraction and fractional crystallization, for separating a component from a solution or an intimate mixture, fractional crystallization is generally resorted to in commercial practice only when other procedures cannot satisfactorily be employed. Simple direct crystallization steps, and even two or three successive crystallizations to separate and purify a component, are sometimes used, but a fractional crystallization procedure is generally avoided, if possible. The reason is that a fractional crystallization, as heretofore carried out, involves a multiplicity of transfers of materials between vessels and usually a number of heating and cooling operations in order to separate a component from a mixture. Such repeated crystallization operations are costly, time-consuming and frequently result in considerable losses of valuable components in discarded mother liquors.

It is an object of this invention to provide a method whereby fractional crystallization operations may be carried out in a relatively simple manner, well adapted to commercial practice. Another object is to provide such a method, whereby a degree of purification of a substance, commensurate with, or superior to, that heretofore obtainable through repeated crystallizations using a long train of crystallization vessels, may be accomplished by a single passage of the material to be purified through a purification zone. A further object is to provide apparatus suitable for carrying out fractional crystallizations in a continuous manner. Other objects will be evident from the following description of the invention.

The method involves passage of solidified material, comprising a component, A, to be concentrated or purified by recrystallization, upward, e. g. vertically or at an incline, through a zone of increasing temperatures. At successive points of advancement through the zone, solid materials having melting points at, or below, the temperature prevailing at such point, become melted, so that the solids which remain or are simultaneously formed by recrystallization are enriched in the component A. As the solid material then present advances to a point of higher temperature further melting occurs and this melt is richer in the component, A, than is the melt produced at a lower point in the zone. The liquid produced by such melting trickles or seeps downward, as a liquid reflux, over the advancing solid material at lower points in the zone. Thus, solid material advancing upward through the zone becomes wetted, and melted by, or dissolved in, the reflux liquor relatively rich in the component, A, which is to be purified by recrystallization. Recrystallization then occurs with formation of crystals further enriched in the component A. Since the recrystallized solids advance from said point to successively higher points in the zone, at which similar recrystallizations take place, the concentration of the above-mentioned component, A, increases, during continued operation, at the highest point at which any of the material under treatment remains solid, until ultimately the uppermost solid material in the zone consists of said component, A, in substantially pure condition. Also, in the early stages of operation, the quantity of such component, A, being produced in purified condition increases until a condition of balance is reached, after which the rate of production usually is substantially constant. The purified component, A, is withdrawn from the top of the zone. If desired, a portion of the product withdrawn from the top of the zone may be returned, in molten condition, to the top of the zone as reflux material.

For convenience, the zone just discussed, within which the material undergoes repeated recrystallizations in contact with a liquid reflux relatively rich in the component, A, to be purified by recrystallization, will hereinafter be termed the "reflux zone." We believe ourselves first to discover a method whereby reflux conditions may satisfactorily be applied in carrying out fractional crystallization operations.

The liquor descending from the reflux zone is passed through a zone of lower temperatures so as to crystallize therefrom dissolved material comprising the component, A, being purified by recrystallization. This colder zone is referred to herein as the "direct crystallization zone." The material thus recovered by direct crystallization from the reflux liquor is lifted into the reflux zone. The remaining liquid may be withdrawn from the system.

For efficient operation, certain precautions should be observed in carrying out the process. It is important that the solid material being advanced upward through the reflux zone be in the form of individual crystals or small clusters of crystals, i. e. not an extensive cake or a solid mass, so as to permit intimate mixing and wetting of the same with the reflux liquor. It is also important that the reflux liquor pass through and from the mass of ascending crystals or granules. Flow of the reflux liquor over and from the material to be recrystallized is facilitated by avoiding flooding of the reflux zone with liquor (in which case the material to be recrystallized would be submerged in the liquor) and by employing the solid under treatment in the form of crystals or granules of a size sufficient to permit free drainage of the liquor through and therefrom. However, the liquor can continuously be passed through and withdrawn from the material under treatment even when such material is in the form of extremely fine crystals and there are no exact or critical limits as to the granule sizes which may be employed.

Thorough wetting of the granules with liquor and drainage of the latter may also be facilitated by stirring or otherwise agitating the granules under treatment, but this is not essential. Such agitation, when employed, may advantageously be in a manner which causes some of the crystals or granules to drop short distances and at random within the reflux zone while causing an overall upward movement of the granules through the zone. This has an average effect of increasing the path of travel of the material through said zone so as to increase somewhat the efficiency of the process. Agitation also aids in breaking any adhering crystals from walls of the reflux chamber and aids in preventing coalescence of the granules undergoing recrystallization. For these reasons it is highly advantageous, but not essential, that the material undergoing fractional recrystallization be agitated.

For efficient operation, it is necessary to control the upward movement of crystals and downward flow or reflux liquor at rates low enough to permit intimate contact of the liquid and crystalline phases and time for the liquid-solid phase mass transfer to take place. The rate of upward movement of crystals is controlled by the mechanism used to elevate the crystals. The downward flow of reflux liquor may be controlled by the rate of supplying heat to the top section of the column, or by melting a portion of the overhead product and returning it to the top of the reflux zone and controlling the rate of return of this reflux material. We have found it possible to operate the apparatus at rates exceeding its capacity for efficiently effecting a fractional crystallization, in which case a satisfactory separation of a component from a starting mixture is obtained by decreasing the rate of throughput. A rate of reflux such as to cause a trickle of liquor over the ascending solids, with thorough wetting of such solids and without flooding the reflux zone with liquor, is satisfactory.

It is important that complete flooding of the reflux zone with the liquor be avoided, since the filling of said zone with a slurry of crystalline material immersed in a continuous body of liquor permits churning and excessive mixing of the reflux liquor which decreases greatly the efficiency of the fractional crystallization. By restricting the rate of reflux and distributing the latter over the ascending crystals so that the latter are merely surface-wetted, but not immersed in the liquor, the fractional crystallization may be accomplished efficiently. Local flooding, e. g. over a distance corresponding to half or less of the length of the reflux zone, sometimes occurs and can be tolerated without an excessive loss of efficiency. However, even local flooding within said zone is avoided as far as possible. The lower, or direct crystallization, zone may be, and usually is, flooded with liquor.

It may be mentioned that the purified material delivered from an upper section of the reflux zone often consists substantially of a single compound which is the highest melting component of the mixture or solution fed to the purification system, but that such is not always the case. There are instances in which a mixture contains a minor amount of a component of a given melting point and a major amount of another component compatible therewith, but of lower melting point. In such instances, it frequently happens that a portion of the ingredient of lower individual melting point crystallizes first, (or, conversely, it melts at a higher temperature than the remainder of the mixture) in which case it is the purified material delivered from the top of the reflux zone. There are other instances in which the material which is first to crystallize, or last to melt, consists of a double compound, of two or more ingredients of a more complex mixture subjected to the purification treatment. In such an instance, it is this double compound phase that is delivered as a purified material from an upper section of the reflux zone. In other words, the material which is purified by recrystallization from a mixture in the present system is that which would be purified, at least to some extent, by fractional crystallization upon subjecting a similar mixture to a conventional fractional crystallization procedure. The material which is withdrawn from the bottom of the column is enriched, by the treatment, in the component or components of the starting mixture other than that purified by crystallization from the mixture. When employing a starting mixture of nearly, but not exactly, a eutectic composition, a portion of one of the components in purified form may be obtained as the overhead product and a liquor of composition extremely close to the eutectic value may be obtained as the bottom product.

The method of the invention is applicable to all mixtures, both organic and inorganic, which can be fractionally crystallized in a conventional manner to separate one or more components therefrom. Thus, it can be applied in treating aqueous solutions of salts of the rare earth metals to separate such salts from one another, or in crystallizing magnesium chloride from an aqueous solution of the same and calcium chloride, and it can be applied in crystallizing styrene of high purity from a mixture of styrene and ethylbenzene, or in crystallizing para-dichlorobenzene from a mixture of ortho- and para-dichlorobenzenes, or in crystallizing para-xylene from a mixture of ortho-, meta- and para-xylenes, etc. In some instances, solvents or immiscible liquid diluents may advantageously be added to a mixture, from which a component is to be crystallized, for purpose of permitting ready crystallization at temperatures within a desired range, or to cause a single, rather than a double, compound to be purified by crystallization, etc. The method is applicable, regardless of the number of components in the mixture subjected to the treatment, e. g. it can be applied to mixtures or solutions containing from three to five or more components as well as to those containing only two components. It may also be applied for separating one or more components from mixtures which freeze as solid solutions, e. g. for separating ethylene bromide from a mixture of the same and ethylene chloride.

The apparatus for practice of the invention consists essentially of a vertical or inclined tower having an inlet to a midsection or a lower section thereof and outlets from its lower and upper sections. Temperature control means, e. g. a heat insulating jacket, or heating or cooling units, are provided along the tower. The tower is also provided on the inside with an elevator for collecting and raising solid materials while permitting a downflow of liquor over the same. The design and construction of such apparatus may be varied widely.

The accompanying drawing shows certain of the various forms of apparatus which may be employed in practice of the invention. Fig. 1 of the drawing is a side view, partly in cross-section, of an arrangement of apparatus suitble for practice of the invention. The apparatus comprises a tower, or column, 1, having a side inlet 2 leading from a storage vessel, and a valved bottom outlet 4 leading to a vessel 5. At the top, tower 1 is provided with a launder 6 which is in the form of a vessel having the open upper end of tower 1 projecting through the bottom thereof. The launder, or vessel, 6 is provided with a top 7 having a central bore, or opening, 8 for projection of shafts therethrough. A bottom outlet 9 leads from launder 6 to a heating or cooling unit 10 which, in turn is connected by a line 11 to a receiving vessel 12. Unit 10 is shown as a jacketed tube having an inlet and outlet to the jacket for passage of a heating or cooling fluid therethrough, but any of various other conventional forms of temperature control units, e. g. an electric heater, may be used. In many instances, the temperature-control unit 10 may be omitted. A ring shaped electric heating element 13 is situated near the bottom of launder 6 about the upper end of tower 1. The heating element 13 is provided with a terminal 14 and also with another similar terminal, not shown. Each terminal projects through the wall of launder 6 and is insulated therefrom by the surrounding insulating material 15. A temperature-control coil 16, through which a cooling or a heating fluid may be passed, is situated about the walls of an upper section of tower 1. Another such temperature-control coil, 17, is situated about the walls of a lower section of the tower.

The tower 1 is provided on the inside with a pair of mating and intermeshed feed screws 18 and 19 which rest on a rotatable bearing block, or plate, 20. The latter is provided with a center shaft 21 which extends downward and rests on another bearing block 22 having arms 23 that are anchored to inner walls of the tower 1. The threads, or blades, of the feed screws 18 and 19 extend upward into the vessel 6. They have upper surfaces which preferably are nearly horizontal in a direction perpendicular to the principal axis of each screw, but this is not essential. It is sufficient that the upper surfaces of the threads or blades be shaped and positioned so that they may carry granular material thereon during rotation of the screws. The threads of the feed screws usually extend to a minimum distance of between 1/32 and 1/16 inch from inner surfaces of the tower 1 so as to break adhering crystals from inner walls of the tower during rotation of the screws, but this spacing is not critical and may be smaller or considerably greater than just recommended. The central shafts of the feed screws 18 and 19 extend upward through the top 7 of vessel 6 and connect with gears supported by a rotatable bearing block 24 as shown. A screen 25 is preferably positioned horizontally across the chamber of tower 1 at a point below the feed screws 18 and 19, so as to prevent descent of granular or crystalline material to points lower in the tower. This screen is employed as a precautionary measure to avoid possible loss of crystallized components of a mixture under treatment and may be omitted.

Fig. 2 is a top view of the section A—A of tower 1. The parts are numbered as in Fig. 1.

Figure 4:
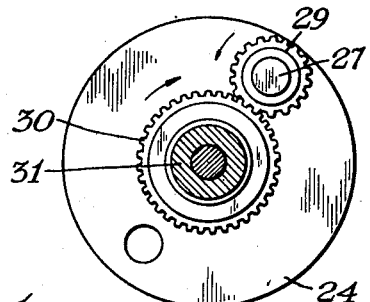
Figure 3:
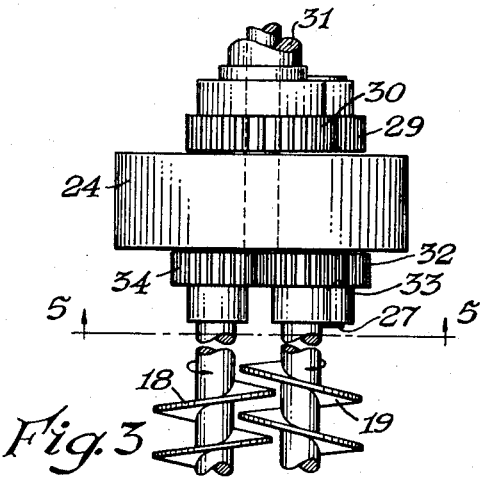
Figure 5:
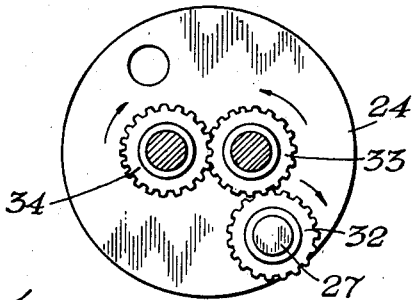

In Figs. 1 and 2 the feed screws 18 and 19 are of opposite pitch, i. e. they are "oppositely wound." Such screws are geared so as to be rotated in opposite directions with respect to each other, the directions of rotation being such as to lift solids upward by the action of the threads or blades thereof. Figs. 3, 4, and 5 show a gear arrangement suitable for this purpose.

Fig. 3 is a side view of a gear arrangement which includes a rotatable bearing block 24 having the shaft 27 extending therethrough. Gear 29 is mounted on the upper end of the shaft 27. A drive gear 30, having a shaft 31, is mounted in a center position on the bearing block 24 and meshes with the gear 29. A gear 32 is mounted on the lower end of shaft 27. The gear 32 meshes with another gear 33 which, in turn, is meshed with a third gear 34, both of which gears 33 and 34 are mounted on shafts seated in recessed bearings, not shown, in the bottom section of the bearing block 24. The shafts on which the gears 33 and 34 are mounted are those of the feed screws 18 and 19.

Fig. 4 is a top view and Fig. 5 is a bottom view of the gear arrangement shown in Fig. 3. Figs. 4 and 5 show an unused transverse bore through block 24 which may be omitted when employing the gear arrangement of Figs. 3–5. Said bore is advantageously provided in order that the same bearing block 24 may be used with a different gear arrangement shown in Figs. 6–8.

Figure 6:
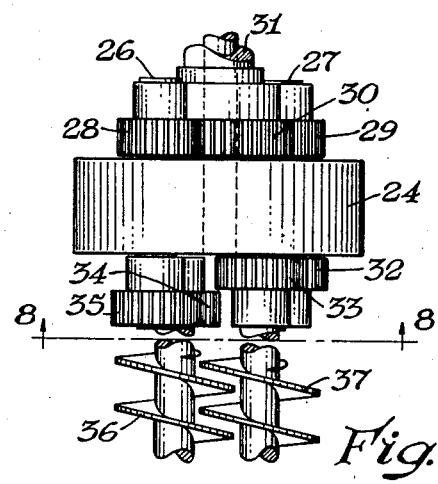

If desired the feed screws for use in tower 1 of Fig. 1 may be of the same pitch, i. e. the threads or blades thereof may be "wound" in the same direction about the axis of each screw. In such instance, the screws are both rotated in the same direction about their respective axes, the direction of rotation being such as to lift granular material by the action of the screws. Fig. 6 is a side view of a pair of intermeshed screws, 36 and 37, of the same pitch attached to a gear arrangement which provides for rotation of both screws in the same direction about their respective axes.

In Fig. 6, shafts 26 and 27 extend through the bearing block 24 and have mounted on the upper ends thereof the respective gears 28 and 29. A drive gear 30 provided with a shaft 31 is positioned on the bearing block 24 so as to mesh with each of the gears 28 and 29. A gear 32 is mounted on the lower end of shaft 27 and meshes with another gear 33 adjacent thereto. A gear 35 is mounted on the lower end of shaft 26 and meshes with an adjacent gear 34. Gears 33 and 34 are positioned so as not to mesh or interlock with one another. The gears 33 and 34 are attached to upper ends of the shafts of the respective feed screws 36 and 37, which shafts rest in recessed bearings, not shown, in the lower section of the bearing block 24.

In employing the apparatus of the drawing, e. g. of Figs. 1–5, for the separation, in an continuous manner, of a component A from a liquefiable mixture or solution comprising the same together with other components, B—X, the component A being that which crystallizes at the highest temperature from the liquefied mixture, an upper section of tower 1 is brought, e. g. by means of passing a heating fluid through coil 16, or by means of other usual temperature control means, to a temperature corresponding to, or preferably somewhat, e. g. from 1° to 30° C., above the melting point of the pure component A. The lower direct crystallization section of the tower is at the same time brought, by passage of a heating or cooling fluid through coil 17, to a temperature low enough to assure crystallization of component A from the mixture under treatment without solidifying all of the liquor which flows downward through said section. The preferred temperatures inside the top of tower 1 and within the direct crystallization section of the tower are dependent of course on the identity of the materials under treatment. There are instances in which both temperatures are above that of the room, in which case both the direct crystallization section and the upper section of the tower are heated, but to different temperatures. There are other instances in which the freezing point of component A is below room temperature, in which case cooling fluids are passed through the respective coils 16 and 17 so as to cool the tower both at the top and at the direct crystallization section thereof, the latter being cooled to the lower temperature.

There is thus established a temperature gradient over the column from the direct crystallization section thereof to its top. It may be mentioned that the feed screws 18 and 19 which are usually of a thermally conductive metal such as steel, brass, nickel, or silver, etc., aid in maintaining a suitable temperature gradient. Heat losses and irregular heating due to uneven temperature conditions in the room may be minimized by providing a heat-insulating casing about tower 1 and its temperature control means.

While maintaining tower 1 under the temperature conditions just stated, the mixture from which component A is to be separated is fed, through inlet 2, to the tower. The point of feed may be to a midsection of the tower, as shown in the drawing, or to a lower point, e. g. to the direct crystallization zone. The mixture may be in liquefied form, or in a solid crystalline or granular form, or in the condition of a slurry of crystalline and liquefied materials when fed to the tower. It may be fed to a midsection of the tower or to the lower direct crystallization section thereof. In some instances, the component A crystallizes in undesirably fine form from the completely liquefied mixture under the conditions prevailing in the tower. In such instance it often is well to effect at least partial crystallization of the mixture outside the tower under conditions which induce growth of the larger crystals prior to feed of the mixture to the tower. The relatively large crystals in the feed mixture serve as seed for inducing formation of crystals of a desired size during processing within the tower.

The individual feed screws 18 and 19, and also the assembly of said screws, are rotated, while feeding the mixture to the tower, so as to collect crystalline material and carry it upward. During ascent through the reflux zone of the tower the crystals undergo recrystallization and partial melting with formation of a reflux liquor which trickles or seeps downward over the crystalline material at lower points in the tower. The reflux liquor ultimately flows through the direct crystallization section of the tower where a portion thereof is recrystallized as material fairly rich in the component A. The remaining liquor flows from the tower through outlet 4 and is collected in vessel 5. The purified component A is discharged from the feed screws 18 and 19, due in part to their intermeshing action, and falls into the launder 6 where it is melted, e. g. by heat from the element 13. It then flows through outlet 9, temperature control unit 10, and line 11 to the receiving vessel 12.

If desired, a portion of the product being collected overhead may be returned continuously in molden condition to the top of the tower 1 as reflux material. The molten product thus returned as reflux material may be used to supply the heat necessary for further operation and external heating of the top section of tower 1, e. g. by means of the element 13, may be discontinued. Thereafter, the crystalline product coming overhead may be withdrawn in crystalline form and melted, or may be melted and withdrawn, without need for direct heating of the top of the tower.

The fractional crystallization method of the invention may be practiced batchwise instead of in the continuous manner just described. In carrying the process out batchwise, the valve to the outlet 4 of tower 1 is closed and the tower is partially filled with the mixture from which a component, A, is to be crystallized. The upper reflux zone of the tower is, of course, not filled with the mixture.

If not initially liquid, the mixture is at least partially melted and the feed screws 18 and 19 are rotated to cause an upward movement of any crystalline material from the mixture. The pool of material in the lower direct crystallization zone of the tower is brought to and during operation is maintained at a temperature below the freezing point of the pure component A and such as to cause partial, but not complete, crystallization of said pool of material. The top of the tower is at the same time brought, e. g. by means of the heating coil 16, to a temperature as high as, or preferably above, the melting point of the pure component A.

As a result, the crystalline material conveyed upward by the feed-screws 18 and 19 undergoes partial melting and recrystallization as it ascends the tower and the melt trickles as reflux material over crystals at lower points in the reflux zone. Upon continued operation crystalline material ascends to higher levels in the tower until ultimately the purified crystalline component A is delivered from the top. If desired, a portion of this overhead product, A, may be melted and returned as reflux material into the upper section of the tower, i. e. at or near the top of the reflux zone, in which case external heating of the top of the tower, e. g. by the coil 16, may be discontinued and the heat necessary for continued operation be supplied by the portion of the overhead product which is being returned in molten condition to the upper section of the tower.

Continued operation in the batchwise manner just described results in the pool of material in the bottom of the tower being depleted of the component, A, and being thereby enriched in the other components which it initially contained. This batchwise mode of operation may be continued until the product being collected overhead no longer consists of the component A in a satisfactory state of purity.

The method and apparatus, as just described, may be modified in any of a number of respects. For instance, instead of using a pair of intermeshing feed screws as the elevator in tower 1, a single screw can, though not as conveniently, be used, in which case the screw may be rotated within the tower or the tower walls may be rotated about the screw. Again, the elevator may be in the form of a series screen trays or screen baskets mounted on a belt which travels upward along an inner face of the tower wall and downward over the wall, crystalline material being discharged from the trays or baskets after they reach the top of the tower. In such instance, the inner horizontal cross-section of the tower may advantageously be square or rectangular, rather than circular. The elevator may also be in the form of a ring of five or more mating and intermeshing parallel feed screws, which ring as a whole may be rotated, or oscillated, while rotating the individual screws. Such ring of feed screws may be within an annular space between inner and outer walls of a tower constructed of concentric tubes and both the inner and outer walls of the tower may be provided with temperature control means. In place of the coils 16 and 17 of Fig. 1, other temperature control means such as electric heating units, infrared lamps, heat from the room, or heating or cooling jackets, etc., may be in some instances more conveniently be used.

It will, of course, be evident that the material discharged from either the top or bottom of the fractional crystallization device may be fed, e. g. in intermittent or continuous manner, to another similar device for further processing. This mode of operation is of particular advantage in separating two or more individual components from a complex mixture comprising the same.

Still other ways in which the method and apparatus of the invention may be modified will be apparent.

The following examples describe a number of ways in which the invention has been practiced, but are not to be construed as limiting its scope.

Example 1

A fractional crystallizer, similar to that shown in Figs. 1-5 of the drawing, was used for the separation of benzene from a liquid $C_6$ fraction of cracked-oil gas, which fraction contained benzene together with aliphatic hydrocarbon such as hexane, hexene, etc. The fractional crystallization tower was heated at the top by means of a heating element 16 and was cooled in the direct crystallization section thereof by passing, through the coil 17, a mixture of chloroform and carbon tetrachloride that had been cooled with solid carbon dioxide. The feed screws 17 and 18 were at the same time rotated in directions such as to elevate any solids brought into contact therewith. While operating the fractional crystallizer in this manner, the liquid $C_6$ fraction was fed thereto through inlet 2 at a rate of 600 milliliters per hour. The liquid crystallized for the most part in the direct crystallization, i. e. the refrigerated, section of the tower and the crystals were carried upward by the screws 18 and 19. Portions of the ascending crystals spilled short distances in a random manner from the feed screws, but the latter caused an overall upward movement of the mass of individual crystals. During ascent through the tower the crystals were heated at increasingly higher temperatures with a result that melting and recrystallization both occurred and the molten material trickled or seeped as a reflux from the points of higher temperatures downward through the crystalline mass and into the direct crystallization zone. Material remaining liquid during downward flow through and from said zone was removed as a bottom product through outlet 4. During continued operation, the top level of the crystalline material ascended the tower until crystals were spilling continuously into the launder 6. The crystalline material in the launder was melted by heat from the element 13 and the melt flowed to the receiving vessel 12 where it was collected as the overhead product. Collection of the overhead product was continued over a period of about 3½ hours. During operation, the bottom product was withdrawn at an average rate of 345 ml. per hour and the top product was withdrawn at an average of 201 ml. per hour, the difference between the rate of feed and the sum of said rates of withdrawal being accounted for by changes which occurred in the inventory of material in the fractional crystallization tower. The bottom product contained approximately 10 per cent by volume of benzene and had a freezing point of —56° C. The overhead product was substantially pure benzene having a freezing point of 5.32° C., a density of $D_4^{25}=0.8761$ gms./ml., and a color, on the APHA scale, of 5. It contained 0.0198 per cent by weight of sulphur. When subjected to slow distillation for determination of its boiling range, it was found that the first drop of the benzene distilled at 79.1° C. at 760 milliliters absolute pressure, that the distilling temperature rose to 79.9° C. during collection of the first five milliliters of distillate, and that the remaining material (92.5 ml.) which distilled up to the dry point came over at 79.9°–80° C. with the last and major portion thereof distilling at a constant temperature of 80° C. at 760 mm. absolute pressure.

Example 2

A commercial light oil, having a freezing point of —2° C., a boiling range of from 75° to 108° C. at atmospheric pressure, and containing benzene as its principal component and about 15 per cent of toluene as a minor component, was fed at a rate of 400 ml. per hour to a fractional crystallizer similar to that shown in Figs. 1–5 of the drawing while operating the crystallizer as described in Example 1. A light brown bottom product, having a freezing point of —61° C., was withdrawn at an average rate of about 79 ml. per hour. Benzene was withdrawn as the overhead product at a rate, from the time of starting collection of the same, of 332 ml. per hour. The benzene thus collected had a freezing point of 5.30° C., a density of $D_4^{25}=0.8772$, an APHA color of 3, and contained 0.1009 per cent of sulphur.

Example 3

Benzene, of freezing point 5.4° C., which had been recovered from the kind of starting material and by the procedure described in Example 2 was again fed to the fractional crystallizer. This benzene was of high purity, but contained trace impurities of unknown identity which caused it to develop a red wine color when treated with concentrated sulphuric acid. The fractional crystallizer was operated as in Example 2, except that water was slowly fed into an upper section of the tower and allowed to trickle down over the benzene undergoing recrystallization and the direct crystallization zone was cooled by passing an aqueous ethylene glycol solution, chilled to —11°

C., through the coil 17 shown in Fig. 1 of the drawing. Wash water was removed continuously through the outlet 4. The benzene collected as the overhead product was water white and turned to a light amber color when treated with concentrated sulphuric acid. In this experiment, the wash water apparently aided in removal of the trace impurities causing discoloration on treatment of the benzene with sulphuric acid; prevented caking of the benzene crystals formed in the direct crystallization zone; and facilitated heat transfer to maintain an even temperature gradient in the system.

Example 4

A commercial grade of cyclohexane, having a freezing point of $-15°$ C. and containing about 80 per cent of cyclohexane and 20 per cent of other hydrocarbons such as methyl-cyclopentane, hexanes and benzene, was fed, over a period of 6 hours 55 minutes, to the midsection of a fractional crystallizer similar to that shown in Figs. 1–5 of the drawing. The crystallizer was operated as described in Example 1. A total of 2225 ml. of the commercial cyclohexane stock was fed to the crystallizer; 770 ml. of material, freezing at temperatures in the order of from $-55°$ to $-60°$ C., was withdrawn as bottom product; and 1425 ml. of purified cyclohexane was obtained as the overhead product. The purified cyclohexane had a freezing point of $6.2°$ C.; contained 0.0065 per cent by weight of sulphur, 0.0026 per cent of chlorine and less than 0.001 per cent of benzene, and distilled at $80.4°$–$80.6°$ at 760 mm. absolute pressure.

Example 5

Figure 7:
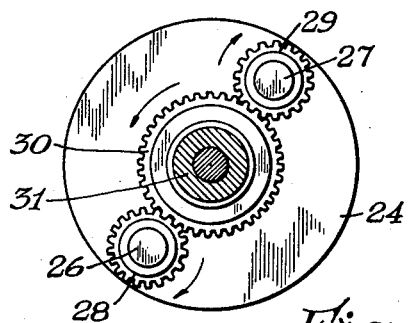
Figure 8:
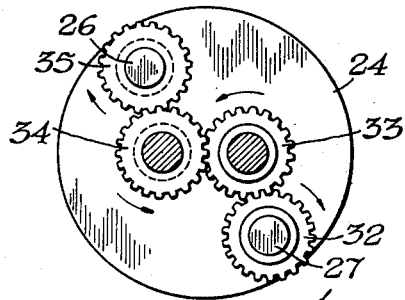

The procedure of Example 4 was repeated in each of two experiments, except that in these experiments a pair of feed screws of the same pitch, both rotated in the same direction about their individual axis, were used in place of the feed screws 18 and 19, of opposite pitch and of opposite directions of rotation, shown in Fig. 1 of the drawing. Figs. 6–8 illustrate such a pair of similar feed screws, 36 and 37, and a gear arrangement for operation of the same. The experiments of this example differed from one another in that one was carried out with rotation of the feed screws about their individual axes, to cause elevation of solids in the crystallization tower, but without rotation of the screw assemblage about its principal axis, whereas the other experiment was carried out with similar rotation of the individual feed screws and with concurrent rotation of the screw assemblage. In the experiment wherein the individual screws were rotated without rotation of the screw assemblage, samples of the cyclohexane overhead product collected at intervals varied in freezing point from $2.0°$ C. to $3.5°$ C. In the experiment in which the screw assemblage was also rotated, samples of the cyclohexane overhead product, collected at intervals, varied in freezing point from $5.4°$ to $5.9°$ C. Accordingly, all of the modes of operation of this example, and of Example 4, are operable. However, the experiments show that under otherwise similar operating conditions, the efficiency of fractionation is greater when both the screws and the screw assemblage are rotated than when rotating only the individual screws. Use of screws of opposite pitch and opposite rotation appeared to result in somewhat more efficient fractionation than was obtained using screws of the same pitch and same direction of rotation, but the difference in result was not great and may have been due to other unrecognized causes.

Example 6

Using apparatus and a mode of operation similar to that described in Example 1, a mixture of the o-, m- and p-isomers of xylene together with minor amounts of toluene and ethylbenzene, which mixture was rich in p-xylene and had a freezing point of $11.8°$ C., was fed to the fractional crystallizer. A total of 8.3 liters of the mixture was fed to the system. As the overhead product there was obtained 8 liters of purified p-xylene having a freezing point of $13.2°$ C. As the bottom product there was obtained 150 ml. of a mixture which analyzed as containing 33.5 per cent by volume of p-xylene, 33.0 per cent of m-xylene, 3.5 per cent of o-xylene, 14.5 per cent of toluene, and 12.2 per cent of ethylbenzene, the remainder being of unknown identity. The overhead product was compared with a sample of p-xylene from the U. S. Bureau of Standards and was apparently of equal purity.

Example 7

One part of a crude pyrolysis mixture resulting from the pyrolytic dehydrogenation of ethylbenzene was admixed with 1.5 parts of purified styrene to form a solution containing about 75 per cent by weight of styrene together with other hydrocarbons such as benzene, ethylbenzene, etc. The solution was fed to a fractional crystallizer similar to that shown in Figs. 1–5 of the drawing while operating the crystallizer in a manner similar to that described in Example 1. A total of 460 ml. of the solution was fed to the crystallizer in 1 hour 55 minutes. During this period 115 ml. of styrene of 99.47 per cent purity and having a freezing point of $-30.87°$ C. was collected as the overhead product. The bottom product consisted of 260 ml. of liquid material having a freezing point of $-50°$ C.

Example 8

The bottom and direct crystallization zones of a fractional crystallizer similar to that shown in Figs. 1–5 of the drawing were filled with isooctane. Styrene of 99.6 per cent purity was fed, at a rate of 100 ml. per hour, to a midsection of the crystallizer while operating the latter in a manner which, except for retention of the isooctane in the lower sections thereof, was similar to that described in Example 1. Periodically samples of the overhead product were tested for purity. They consisted of styrene of from 99.8 to 99.9 per cent purity or higher and had freezing points of from $-30.69°$ to $-30.72°$ C. The bottom product comprised, together with isooctane and a portion of the styrene, ethylbenzene in amount corresponding to about 0.3 per cent of the weight of the styrene feed stock and also small amounts of other impurities of unproven identity but probably including ethylvinylbenzene and divinylbenzene.

Example 9

A dichlorinated benzene mixture, having a freezing point of $22°$ C. and comprising o-, m-, and p-dichlorobenzenes together with a minor amount of monochlorobenzene, was fed to a midsection of a fractional crystallizer similar to that shown in Figs. 1–5 of the drawing. The crystallizer was operated in a manner similar to that described in Example 1. As the bottom product there was obtained 1950 ml. of a liquid having a freezing point of —36° C. and analyzing as containing 65 per cent by weight of o-dichlorobenzene, 11.5 per cent of p-dichlorobenzene, 8 per cent of m-dichlorobenzene, 7.8 per cent of monochlorobenzene and 7.7 per cent of material of unknown identity. The overhead product consisted of 1350 grams of purified p-dichlorobenzene having a freezing point of 52.8° C.

*Example 10*

A mixture of 6 volumes of ethylene bromide and 4 volumes of ethylene chloride was fed at at rate of about 200 ml. per hour to a fractional crystallizer similar to that shown in Figs. 1–5 of the drawing. This starting mixture is one which freezes as a solid solution. The crystallizer was operated substantially as described in Example 1, except that the upper section of the fractionating tower was heated by radiation from an infrared lamp and material in the direct crystallization zone of the tower was cooled to a temperature slightly higher than the freezing point of pure ethylene chloride by intermittent circulation of a liquid refrigerant through the coil 17. As the bottom product, there was obtained 685 ml. of a liquid having a freezing point of —28.5° C. and containing about 80 mole per cent of ethylene chloride and 20 mole per cent of ethylene bromide. The overhead product consisted of 625 ml. of purified ethylene bromide of freezing point 9.2° C. and specific gravity 2.165 at 26°/4° C. The degree of separation obtained corresponds to 6 or 7 successive equilibrium crystallizations as plotted on a freezing point-composition diagram for the system.

*Example 11*

An aqueous ethylene glycol solution, having a freezing point of —4° C. and containing 10 per cent by weight of the glycol, was fed to the mid-section of a fractional crystallizer similar to that shown in Figs. 1–5 of the drawing. The top of the fractionating tower was warmed slightly and material in the direct crystallization zone was cooled to below 0° C., but not sufficiently to cause complete crystallization thereof, while rotating the feed screws 18 and 19. As the bottom product there was obtained an aqueous ethylene glycol solution of about 25 per cent concentration and having a freezing point of —10° C. The overhead product consisted of clear and substantially pure water, having a freezing point of 0° C. and having no odor of ethylene glycol.

*Example 12*

A brine consisting of 1710 grams of calcium chloride, 50 grams of potassium chloride, 16.8 grams of ammonium chloride, 16.8 grams of strontium chloride and 1996 grams of water was fed at a rate of about 550 ml. per hour into a fractional crystallizer similar to that shown by Figs. 1–5 of the drawing. During introduction of the brine, the lower direct crystallization section of tower 1 was cooled by passage of a liquid refrigerant, at a feed temperature of —25° C., through coil 17; the top of the tower was heated by radiations from an infrared lamp; and the screws 18 and 19 were rotated to elevate material crystallizing from the brine within the tower. The portion of the brine passing downward through the tower without freezing or crystallizing was withdrawn through outlet 4 as the bottom product. There was obtained 838 ml. of bottom product as a liquid having a freezing point of —1° C. The crystalline material delivered by the screws 18 and 19 from the top of the tower was melted and withdrawn. There was obtained 1322 ml. of this melted overhead product. It consists of calcium chloride hexahydrate of high purity. It has a freezing point of 29.7° C., retains only 0.17 per cent of potassium chloride and is nearly free of other impurities.

Other modes of applying the principle of the invention may be employed in place of those explained, change being made in the method or apparatus herein disclosed, provided the steps or means stated by any of the following claims or the equivalent of such stated steps or means be employed.

We therefore particularly point out and distinctly claim as our invention:

1. A fractional crystallization method which comprises bringing a mixture to a temperature at which it consists of a slurry of crystalline and liquid materials, continuously lifting crystalline material from the slurry upward through a zone of increasing temperatures so as to cause recrystallization and partial melting of the crystalline material with a resultant downflow of the melt over ascending crystalline material at lower points but above said slurry, the rate of melting being controlled so as to avoid complete immersion of a major portion of the ascending crystalline material in a continuous body of the melt and gradually elevating the material undergoing recrystallization through said zone and delivering the resultant recrystallized material from the top of said zone.

2. A method, as described in claim 1, wherein a portion of the recrystallized material being delivered from the top of said zone is melted and returned in liquid condition as reflux material to the top of the zone and wherein the rate of flow of the liquid reflux material is such as to cause surface wetting of the crystalline material ascending within the zone but not complete immersion of a major portion of the ascending crystalline material in a continuous body of the liquid.

3. A method, as described in claim 1, wherein the mixture is agitated during upward travel of a component thereof through the zone.

4. A method, as described in claim 1, wherein the starting mixture comprises para-xylene and an isomer thereof as its principal components and purified para-xylene is discharged from the top of the zone.

5. A method, as described in claim 1, wherein the starting mixture comprises ethylene chloride and ethylene bromide as its principal components and purified ethylene bromide is discharged from the top of the zone.

6. A method, as described in claim 1, wherein the starting mixture comprises styrene and ethylbenzene as its principal components and purified styrene is discharged from the top of the zone.

7. In a method for accomplishing a fractional crystallization in a continuous manner, the steps of feeding a non-gaseous liquefiable mixture comprising a crystalliable component to a point low in a vertical zone of increasing temperatures, from the bottom to the top of said zone, which temperatures are such as to cause incomplete crystallization of the liquefied mixture during downward flow through the zone and incomplete melting during upward travel through the zone of material crystallized from the mixture, cooling liquid portions of the mixture descending within said zone sufficiently to cause incomplete crystallization of the same and formation of a slurry in a lower region of the zone, elevating the crystalline material from the slurry upward within said zone so as to cause partial melting and recrystallization of the material as it ascends to points of higher temperatures with resultant downflow of the melt over crystalline material at lower points in the zone, and while continuing said operations withdrawing crystalline material from the top of the zone and discharging liquid material from the bottom of the zone.

8. A method, as described in claim 7, wherein the mixture is agitated during travel of the components thereof through the zone.

9. A method, as described in claim 8, wherein the starting mixture comprises para-xylene and an isomer thereof as its principal components and purified para-xylene is discharged from the top of the zone.

10. A method, as described in claim 8, wherein the starting mixture comprises ethylene chloride and ethylene bromide as its principal components and purified ethylene bromide is discharged from the top of the zone.

11. A method, as described in claim 8, wherein the starting mixture comprises styrene and ethylbenzene as its principal components and purified styrene is discharged from the top of the zone.

LUDO K. FREVEL.
LEONARD J. KRESSLEY.

References Cited in the file of this patent

UNITED STATES PATENTS

| Number | Name | Date |
|---|---|---|
| 1,322,758 | Carpenter | Nov. 25, 1919 |
| 1,559,703 | Howard | Nov. 3, 1925 |
| 1,880,925 | Eissner | Oct. 4, 1932 |
| 1,906,534 | Burke | May 2, 1933 |
| 2,147,222 | Treub | Feb. 14, 1939 |
| 2,183,046 | Reilly | Dec. 12, 1939 |
| 2,194,185 | Padgett | Mar. 19, 1940 |
| 2,307,130 | Henry et al. | Jan. 5, 1943 |
| 2,322,438 | Henry et al. | June 22, 1943 |
| 2,348,329 | Cole et al. | May 9, 1944 |
| 2,357,694 | Schutte | Sept. 5, 1944 |
| 2,427,042 | Bowman | Sept. 9, 1947 |
| 2,540,083 | Arnold | Feb. 6, 1951 |
| 2,540,977 | Arnold | Feb. 6, 1951 |

OTHER REFERENCES

Perry, Chemical Engineer's Handbook, second edition, pages 1782-3, 1941.